US012565006B2

(12) United States Patent
Tominaga

(10) Patent No.: US 12,565,006 B2
(45) Date of Patent: Mar. 3, 2026

(54) PRODUCTION METHOD AND PRODUCTION DEVICE FOR THREE-DIMENSIONALLY FABRICATED OBJECT

(71) Applicant: FUJI CORPORATION, Chiryu (JP)

(72) Inventor: Ryojiro Tominaga, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 224 days.

(21) Appl. No.: 18/252,259

(22) PCT Filed: Nov. 20, 2020

(86) PCT No.: PCT/JP2020/043379
§ 371 (c)(1),
(2) Date: May 9, 2023

(87) PCT Pub. No.: WO2022/107307
PCT Pub. Date: May 27, 2022

(65) Prior Publication Data
US 2023/0405935 A1    Dec. 21, 2023

(51) Int. Cl.
*B29C 64/386* (2017.01)
*B29C 64/124* (2017.01)
(Continued)

(52) U.S. Cl.
CPC .......... *B29C 64/386* (2017.08); *B29C 64/124* (2017.08); *B33Y 10/00* (2014.12);
(Continued)

(58) Field of Classification Search
CPC ... B29C 64/112; B29C 64/124; B29C 64/188; B29C 64/336; B29C 64/379;
(Continued)

(56) References Cited

U.S. PATENT DOCUMENTS

2016/0198576 A1*  7/2016  Lewis ................... B29C 64/106
                                                          361/761
2017/0203508 A1   7/2017  Dikovsky et al.
                         (Continued)

FOREIGN PATENT DOCUMENTS

JP        2017-217889 A    12/2017
JP        2019-196019 A    11/2019
                         (Continued)

OTHER PUBLICATIONS

International Search Report issued Jan. 26, 2021 in PCT/JP2020/043379 filed on Nov. 20, 2020 3 pages.

*Primary Examiner* — Yunju Kim
(74) *Attorney, Agent, or Firm* — Oblon, McClelland, Maier & Neustadt, L.L.P.

(57)    ABSTRACT

To provide a production method and a production device for a three-dimensionally fabricated object that can alleviate a limitation on a curable resin to be used, in a case where the three-dimensionally fabricated object having an electronic device is produced using an additive manufacturing method. A production method for a three-dimensionally fabricated object of the present disclosure includes a first fabricating step of fabricating the attached object including an attachment section, to which the electronic device is attachable, with a first curable resin, using an additive manufacturing method, a second fabricating step of fabricating a resin layer with a second curable resin, fabricating a conductor with a fluid containing a metal particle, and fabricating the electronic device having the conductor in the resin layer, using the additive manufacturing method, and an attaching step of attaching the electronic device to the attachment section of the attached object.

9 Claims, 8 Drawing Sheets

(51) Int. Cl.

| | |
|---|---|
| *B29L 31/34* | (2006.01) |
| *B33Y 10/00* | (2015.01) |
| *B33Y 50/02* | (2015.01) |
| *B33Y 70/10* | (2020.01) |

(52) U.S. Cl.
CPC .............. *B33Y 50/02* (2014.12); *B33Y 70/10* (2020.01); *B29L 2031/3481* (2013.01)

(58) Field of Classification Search
CPC ....... B29C 64/386; B29C 64/40; B33Y 10/00; B33Y 30/00; B33Y 50/02; B33Y 70/10; B33Y 80/00; B29L 2031/3481; H05K 1/185; H05K 3/4664
See application file for complete search history.

(56) References Cited

U.S. PATENT DOCUMENTS

| | | |
|---|---|---|
| 2018/0290378 A1 | 10/2018 | Hakkaku |
| 2019/0375009 A1* | 12/2019 | Gibson .................. B22F 10/47 |
| 2020/0031040 A1 | 1/2020 | Goredema et al. |
| 2020/0093000 A1* | 3/2020 | Suzuki .................. B33Y 10/00 |

FOREIGN PATENT DOCUMENTS

| | | |
|---|---|---|
| JP | 2020-15311 A | 1/2020 |
| WO | WO 2016/042610 A1 | 3/2016 |
| WO | WO 2019/102522 A1 | 5/2019 |

* cited by examiner

| SECOND FABRICATING UNIT | 23 |
| THIRD PRINTING SECTION | 71 |
| CURING SECTION | 72 |
| FOURTH PRINTING SECTION | 73 |
| FIRING SECTION | 74 |

| MOUNTING UNIT | 24 |
| SUPPLY SECTION | 105 |
| MOUNTING SECTION | 106 |

| FIRST FABRICATING UNIT | 22 |
| FIRST PRINTING SECTION | 61 |
| CURING SECTION | 62 |
| SECOND PRINTING SECTION | 63 |
| REMOVAL SECTION | 64 |

ASSEMBLY UNIT  25

SCANNING UNIT  26

10
28
34
20
30
36
32
41
43
51
52
53
55
52

Y-AXIS DIRECTION

X-AXIS DIRECTION

FIG. 6

| | FIRST FABRICATING UNIT | SECOND FABRICATING UNIT | DIFFERENCE IN FABRICATING METHOD |
|---|---|---|---|
| FIRST EMBODIMENT | INK JET METHOD | INK JET METHOD | WETTABILITY OF ULTRAVIOLET CURABLE RESIN IS SMALLER IN SECOND FABRICATING UNIT. LINEAR EXPANSION COEFFICIENT OF ULTRAVIOLET CURABLE RESIN IS SMALLER IN SECOND FABRICATING UNIT. ADHESION OF ULTRAVIOLET CURABLE RESIN TO CONDUCTOR IS HIGHER IN SECOND FABRICATING UNIT. FIRST FABRICATING UNIT USES SUPPORT MATERIAL. SECOND FABRICATING UNIT FABRICATES CONDUCTOR AND MOUNTS ELECTRONIC COMPONENT. |
| SECOND EMBODIMENT | PULL-DOWN TYPE SLA | INK JET METHOD | IN ADDITION TO ABOVE-DESCRIBED DIFFERENCES, ADDITIVE MANUFACTURING METHOD IS DIFFERENT |

PRODUCTION METHOD AND PRODUCTION DEVICE FOR THREE-DIMENSIONALLY FABRICATED OBJECT

TECHNICAL FIELD

The present disclosure relates to a production method and a production device for a three-dimensionally fabricated object using an additive manufacturing method.

BACKGROUND ART

Conventionally, a technique for producing a three-dimensionally fabricated object having a conductor by an additive manufacturing method has been developed. For example, in a production method for a three-dimensionally fabricated object of Patent Literature 1, first, a UV curable composition is discharged from an ink jet printer, and then the discharged UV curable composition is irradiated with UV light and cured. Next, a conductive metal ink composition is discharged from an ink jet printer onto a surface of the cured UV curable composition, and the discharged conductive metal ink composition is heated to fabricate a conductive trace.

PATENT LITERATURE

Patent Literature 1: JP-A-2020-015311

BRIEF SUMMARY

Technical Problem

In the technique described in Patent Literature 1 described above, the three-dimensionally fabricated object having a conductor is produced. However, in a case where a conductor such as a conductive trace is fabricated, unlike a general fabricating, there may be a case where a limitation on fabricating occurs. Specifically, there is a problem in that the physical properties of a UV curable composition, for example, an ultraviolet curable resin, are limited in consideration of the influence of the conductive trace on the electrical characteristics and the like.

In view of the above circumstances, an object of the present disclosure is to provide a production method and a production device for a three-dimensionally fabricated object that can alleviate a limitation on a curable resin to be used, in a case where a three-dimensionally fabricated object having an electronic device is produced using an additive manufacturing method.

Solution to Problem

In order to solve the above problem, the present disclosure discloses a production method for a three-dimensionally fabricated object in which an electronic device is attached to an attached object, the method includes a first fabricating step of fabricating the attached object including an attachment section, to which the electronic device is attachable, with a first curable resin, using an additive manufacturing method, a second fabricating step of fabricating a resin layer with a second curable resin, fabricating a conductor with a fluid containing a metal particle, and fabricating the electronic device having the conductor in the resin layer, using the additive manufacturing method, and an attaching step of attaching the electronic device to the attachment section of the attached object. The content of the present disclosure is not limited to the practicing as a production method for a three-dimensionally fabricated object, but may be practiced in various forms. For example, the content of the present disclosure is also useful as a production device for producing a three-dimensionally fabricated object.

Advantageous Effects

According to the production method for a three-dimensionally fabricated object and the production device for producing a three-dimensionally fabricated object of the present disclosure, the electronic device is fabricated in the second fabricating step and attached to the attached object fabricated in the other first fabricating step. In other words, the attached object to which the electronic device is attached can be produced in a separate step from the electronic device. Therefore, the first curable resin used in the first producing step is not limited in the physical properties required for the second curable resin used in the second fabricating step. The limitation on the physical properties required for the first curable resin can be alleviated, and the degree of freedom in selecting the first curable resin is improved. In addition, since the degree of freedom in selecting the first curable resin is improved, it is possible to suppress the production cost of producing a three-dimensionally fabricated object.

BRIEF DESCRIPTION OF DRAWINGS

FIG. 6 is a table illustrating a difference in a fabricating method between a first fabricating unit and a second fabricating unit of each embodiment.

DESCRIPTION OF EMBODIMENTS

1. Configuration of Electronic Device Production Device

Figure 1:
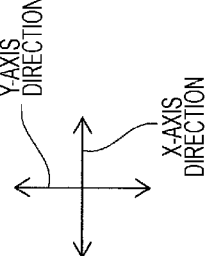
FIG. 1 is a plan view schematically illustrating a state of an electronic device production device according to a first embodiment in a plan view.

Hereinafter, a first embodiment embodying the contents of the present disclosure will be described in detail with reference to the drawings. FIG. 1 is a plan view schematically illustrating a state of electronic device production device 10 according to the present embodiment in a plan view. As illustrated in FIG. 1, electronic device production device 10 is provided with conveyance device 20, first fabricating unit 22, second fabricating unit 23, mounting unit 24, assembly unit 25, scanning unit 26, and control device 27 (refer to FIGS. 2 and 3). Conveyance device 20, first fabricating unit 22, second fabricating unit 23, mounting unit 24, assembly unit 25, and scanning unit 26 are disposed on base 28 of electronic device production device 10. Base 28 has normally rectangular in a plan view. In the following description, a longitudinal direction of base 28 will be referred to as an X-axis direction, a transverse direction of base 28 will be referred to as a Y-axis direction, and a direction orthogonal to both the X-axis direction and the Y-axis direction will be referred to as a Z-axis direction.

Figure 4:
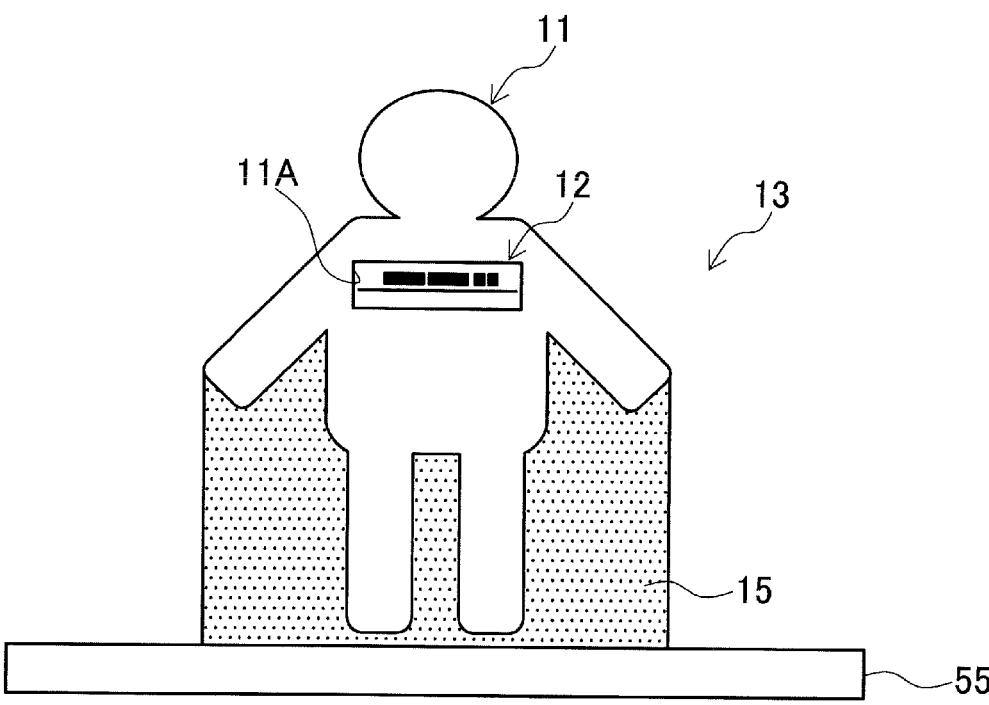
FIG. 4 is a diagram illustrating a fabricated object produced by the electronic device production device.

Electronic device production device (hereinafter, abbreviated as a production device) 10 is a device for producing a fabricated object in which an electronic device produced by second fabricating unit 23 and mounting unit 24 is attached to an attached object fabricated by first fabricating unit 22. For example, as illustrated in FIG. 4, production device 10 produces fabricated object 13 incorporating electronic device 12 in human-shaped attached object 11. In the following descriptions, as an example, a case where fabricated object 13 illustrated in FIG. 4 is produced as a fabricated object will be described.

First, conveyance device 20 illustrated in FIG. 1 is provided with X-axis slide mechanism 30 and Y-axis slide mechanism 32. X-axis slide mechanism 30 includes X-axis slide rail 34 and X-axis slider 36. X-axis slide rail 34 is disposed on base 28 so as to extend in the X-axis direction. X-axis slider 36 is held by X-axis slide rail 34 to be slidable in the X-axis direction. X-axis slide mechanism 30 includes electromagnetic motor 38 (refer to FIG. 2), and moves X-axis slider 36 to any position in the X-axis direction by driving electromagnetic motor 38.

Y-axis slide mechanism 32 includes Y-axis slide rail 41 and stage 43. Y-axis slide rail 41 is disposed on base 28 so as to extend in the Y-axis direction. One end portion of Y-axis slide rail 41 is coupled to X-axis slider 36. Therefore, Y-axis slide rail 41 is movable in the X-axis direction. Stage 43 is held by Y-axis slide rail 41 so as to be slidable in the Y-axis direction. Y-axis slide mechanism 32 includes electromagnetic motor 39 (refer to FIG. 2), and moves stage 43 to any position in the Y-axis direction by driving of electromagnetic motor 39. As a result, stage 43 moves to any position on base 28 by driving of X-axis slide mechanism 30 and Y-axis slide mechanism 32.

Stage 43 includes base table 51, holding device 52, and lifting and lowering device 53. Base table 51 is formed in a flat plate shape, and base member 55 is placed on an upper surface thereof. Holding device 52 is provided on both side portions of base table 51 in the X-axis direction. Holding device 52 fixedly holds base member 55 with respect to base table 51 by gripping both edge portions of base member 55 placed on base table 51 in the X-axis direction. In addition, lifting and lowering device 53 is disposed below base table 51 to lift and lower base table 51 in the Z-axis direction.

First fabricating unit 22 is a unit for fabricating attached object 11 (refer to FIG. 4) on base member 55 placed on base table 51, and includes first printing section 61, curing section 62, second printing section 63, and removal section 64. First printing section 61 is, for example, a unit for fabricating by an ink jet method, and discharges an ultraviolet curable resin from an ink jet head on base member 55 placed on base table 51. The ultraviolet curable resin is a resin that is cured by irradiation with ultraviolet light. A method by which first printing section 61 discharges the ultraviolet curable resin may be, for example, a piezo method using a piezoelectric element, or a thermal method in which a resin is heated to generate bubbles and is discharged from multiple nozzles.

Figure 2:
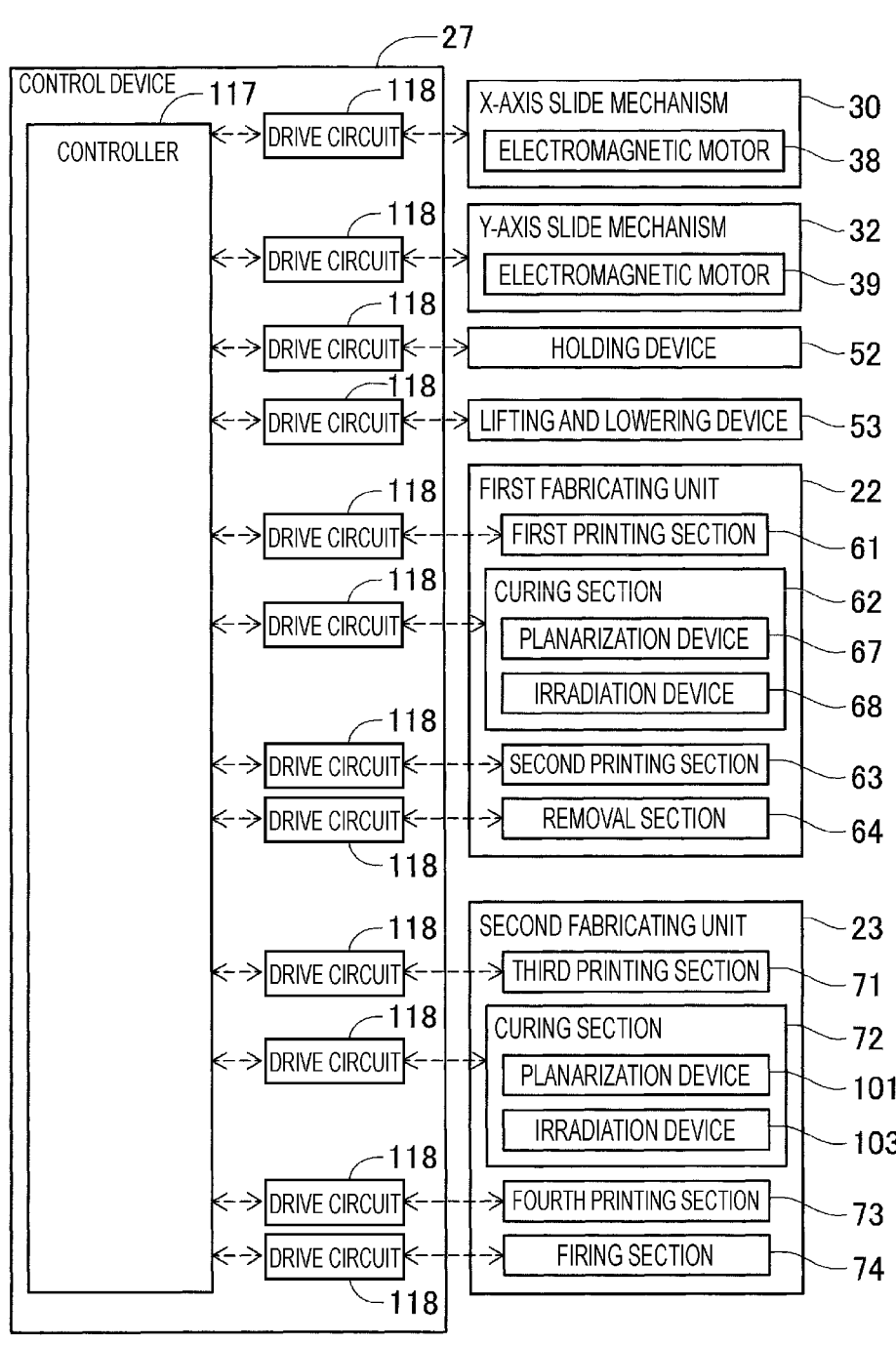
FIG. 2 is a block diagram illustrating a control device.

Curing section 62 includes planarization device 67 (refer to FIG. 2) and irradiation device 68 (refer to FIG. 2). Planarization device 67 flattens the upper surface of the ultraviolet curable resin discharged on base member 55 by first printing section 61. For example, planarization device 67 makes the thickness of the ultraviolet curable resin uniform by scraping off an excessive amount of resin with a roller or a blade while leveling the surface of the ultraviolet curable resin. In addition, irradiation device 68 is provided with a mercury lamp or an LED as a light source, and irradiates the ultraviolet curable resin discharged on base member 55 with ultraviolet light. As a result, the ultraviolet curable resin discharged on base member 55 can be cured, and a resin layer can be formed.

Second printing section 63 is, for example, a device that discharges a support material on base member 55 by an ink jet method, and fabricates support member 15 (refer to FIG. 4) for fabricating attached object 11. As the support material, for example, a material (such as a wax-based material or a resin-based material) that dissolves in a specific liquid such as water or a chemical can be used. Alternatively, as the support material, a material that is melted by heat can be used. In addition, as the support material, a material which is cured by irradiating with light such as ultraviolet light, a material which is cured by applying heat, a material which is naturally cured with elapse of time after discharge, and the like can be used. For example, by discharging and curing an ultraviolet curable resin along a part of support member 15 obtained by curing the support material, it is possible to fabricate attached object 11 along the shape of support member (refer to FIG. 4). By removing support member 15 from an integral part of support member 15 and attached object 11 using a chemical or the like, attached object 11 having an overhang portion (for example, a portion of an arm in FIG. 4) or the like can be fabricated.

Similarly to first printing section 61 described above, second printing section 63 may be configured to discharge the support material by the piezo method using a piezoelectric element, or may be configured to discharge the support material by the thermal method. In addition, as a printing device for discharging an ultraviolet curable resin, a support material, a metal ink to be described later, a conductive resin paste, and the like, the configuration is not limited to an ink jet head including multiple nozzles, and may be a dispenser including one nozzle, for example. In addition, first fabricating unit 22 may use the same ink jet head as the ink jet head for discharging the ultraviolet curable resin and the ink jet head for discharging the support material, and switch the curable viscous fluid to be discharged. The same applies to a metal ink and a conductive resin paste described later.

Removal section 64 is a unit for removing support member 15 fabricated by second printing section 63. For example, in a case where support member 15 is a material dissolved in water, removal section 64 includes a robot arm that immerses fabricated object 13 with support member 15 fabricated on stage 43 in a water tank, and a nozzle device that wipes water on support member 15. In addition, for example, in a case where support member 15 is a material that is melted by heat, removal section 64 may include a heater or a microwave generation device that applies heat to support member 15. Therefore, the configuration of removal section 64 is appropriately changed according to the type of support material.

Figure 5:
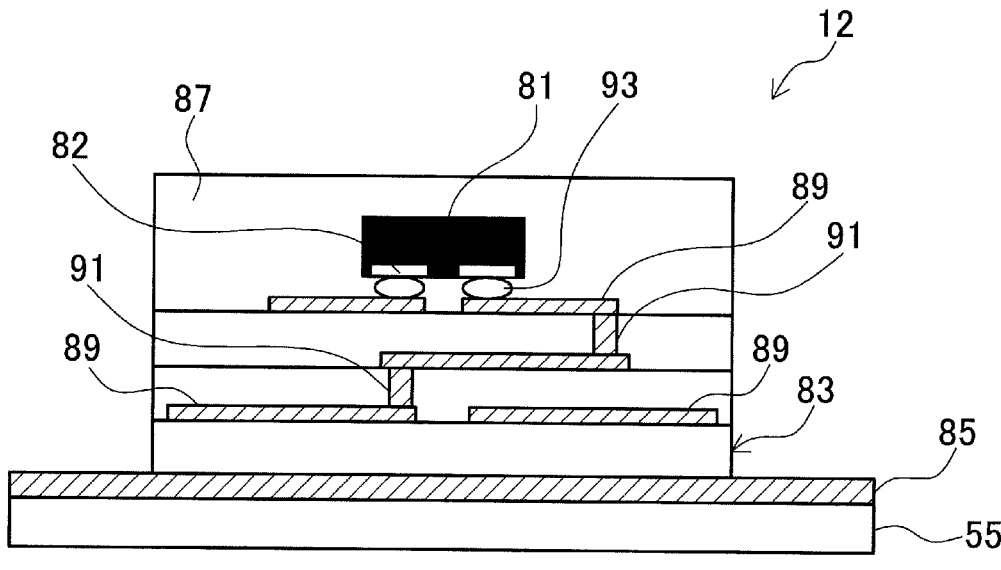
FIG. 5 illustrates an electronic device produced on a base member.

FIG. 5 illustrates electronic device 12 produced on base member 55. As illustrated in FIG. 5, production device 10 of the present embodiment produces electronic device 12 on release film 85 in a state where release film 85 that can be peeled off by heat is attached to an upper surface of base member 55, for example. Release film 85 is a member that is peeled off from base member 55 by being heated, for example, to a predetermined temperature or higher. By peeling off release film 85 from base member 55, electronic device 12 can be separated from base member 55. A method of separating base member 55 and electronic device 12 is not limited to a method using release film 85. For example, support member 15 as illustrated in FIG. 4 may be disposed between base member 55 and electronic device 12, and support member 15 may be melted and separated. In addition, electronic device 12 may be directly produced on base member 55 without using a separating member such as release film 85.

As illustrated in FIG. 5, in electronic device 12, electronic component 81 is mounted on circuit board 83. Second fabricating unit 23 illustrated in FIG. 1 is a unit for fabricating circuit board 83, and includes third printing section 71, curing section 72, fourth printing section 73, and firing section 74. In the following descriptions, descriptions of the same contents as first fabricating unit 22 will be appropriately omitted.

As illustrated in FIG. 5, circuit board 83 is provided with, for example, insulating layer 87, wiring 89 disposed in each layer of insulating layer 87, through-hole 91 that connects wiring 89 of each layer to each other, connection terminal 93 that connects electronic component 81 to wiring 89, and the like. Third printing section 71 is, for example, a device that discharges the ultraviolet curable resin onto base member 55 by the ink jet method. Curing section 72 includes planarization device 101 (refer to FIG. 2) for flattening the ultraviolet curable resin discharged from third printing section 71, and irradiation device 103 (refer to FIG. 2) for irradiating and curing the ultraviolet curable resin discharged from third printing section 71 with ultraviolet light. Second fabricating unit 23 fabricates insulating layer 87 on base member 55 by repeatedly executing the discharge by third printing section 71, the flattening by planarization device 101, and the curing by irradiation device 103.

Fourth printing section 73 is a device that discharges the metal ink on base member 55, on each layer of insulating layer 87, on a hole for a through-hole formed in each layer of insulating layer 87, on the surface of insulating layer 87, and the like, for example, by the ink jet head method. Here, the metal ink includes, for example, a fine particle of a metal (such as silver) having a nanometer size as a main component dispersed in a solvent, and is cured by being fired with heat. The metal ink includes, for example, a metal nanoparticle having a size of several hundred nanometers or less. The surface of the metal nanoparticle is coated with, for example, a dispersant to suppress aggregation in the solvent.

Fourth printing section 73 is a device that discharges a conductive resin paste onto the surface of insulating layer 87, onto wiring 89, or the like by, for example, a dispenser (not illustrated). The conductive resin paste is, for example, a paste in which a metal particle (such as silver) having a micrometer size is dispersed in a resinous adhesive material to be cured by heating. The metal particle is, for example, flake-like. The adhesive contains, for example, an epoxy resin as the main component. The conductive resin paste is cured by applying heat, so that the resin contracts, and the flake-like metal particles dispersed in the resin are in contact with each other. As a result, the conductive resin paste exhibits conductivity.

The conductive paste is cured in a state where the adhesive (resin or the like) is cured by heating, and the flake-like metals are brought into contact with each other. On the other hand, the metal ink becomes an integrated metal by fusing the metal nanoparticles by heating, for example, and the conductivity is higher than in a state where the metal nanoparticles are only in contact with each other. In addition, a conductor formed of a conductive resin paste has a lower conductivity than a conductor formed of a metal ink, for example, while having a strong adhesive force due to the curing of the resin and excellent adhesion. Therefore, production device 10 fabricates a conductor suitable for use by selectively using, for example, a metal ink having high conductivity and a conductive resin paste having high adhesion. In production device 10, for example, the conductive resin paste is used for connection terminal 93 requiring adhesive force, and the metal ink is used for wiring 89 or through-hole 91 requiring conductivity.

Fourth printing section 73 may discharge and apply the metal ink or the conductive resin paste by a method other than an ink jet head or a dispenser. The type of metal contained in the metal ink or the conductive resin paste is not limited to silver, but may be copper, gold, or the like, or may be multiple types. In addition, third printing section 71 may be configured to use only one of the metal ink and the conductive resin paste.

Firing section 74 is, for example, a device for heating the metal ink or the conductive resin paste discharged from fourth printing section 73 by an infrared heater. The metal ink or the conductive resin paste is fired by applying heat from the infrared heater to form wiring 89 or the like. Here, the firing is, for example, a phenomenon in which a solvent is vaporized or a protective film of the metal nanoparticles, that is, a dispersant is decomposed by applying heat to the metal ink, and the metal nanoparticles come into contact or are fused, so that the conductivity is increased. Alternatively, the firing is a phenomenon in which a resin is contracted by applying heat to the conductive resin paste, and the flake-like metal particles dispersed in the resin are brought into contact with each other and fixed. The device for heating the metal ink or the conductive resin paste is not limited to the infrared heater. For example, production device 10 may include an infrared lamp, a laser irradiation device, or an electric furnace that loads and heats a metal ink or a conductive resin paste in a furnace as a device for heating the metal ink or the conductive resin paste.

Mounting unit 24 is a unit for disposing electronic component 81 on base member 55 placed on base table 51, and includes supply section 105 and mounting section 106. Supply section 105 includes multiple tape feeders 107 (refer to FIG. 3) for feeding out the taped electronic components one by one, and supplies electronic components 81 at each supply position. Electronic component 81 is, for example, a sensor element such as a temperature sensor. Supply section 105 is not limited to a device for supplying electronic component 81 from tape feeder 107, and may be a tray type supply device for picking up and supplying electronic component 81 from the tray.

Figure 3:
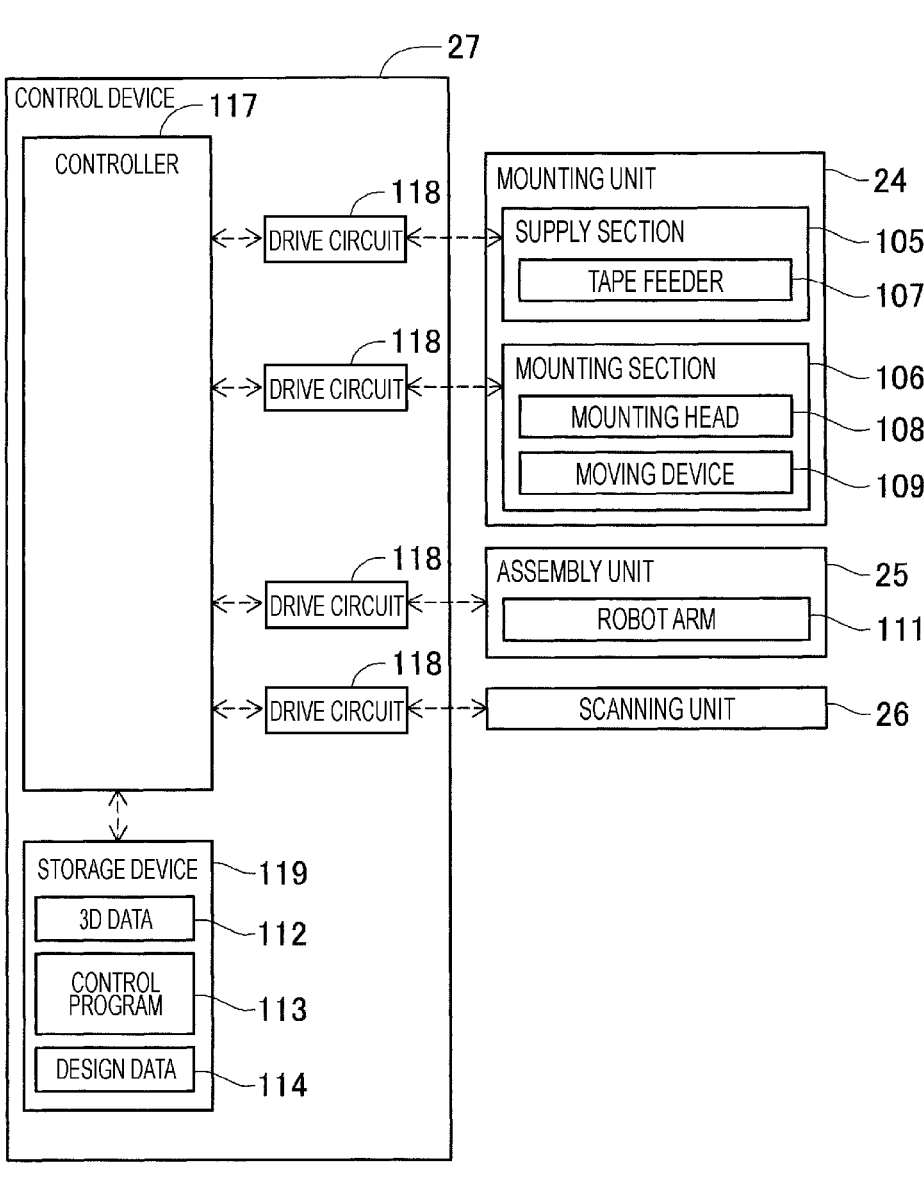
FIG. 3 is a block diagram illustrating the control device.

Mounting section 106 includes mounting head 108 (refer to FIG. 3) and moving device 109 (refer to FIG. 3). Mounting head 108 includes a suction nozzle for picking up and holding electronic component 81. In addition, moving device 109 moves mounting head 108 between the supply position of tape feeder 107 and base member 55 placed on base table 51. As a result, mounting section 106 holds electronic component 81 by mounting head 108, and disposes electronic component 81 held by mounting head 108 on base member 55.

Assembly unit 25 is a device for attaching electronic device 12 to attachment section 11A (refer to FIG. 4) of attached object 11. Assembly unit 25 is provided with, for example, robot arm 111 for gripping electronic device 12. For example, assembly unit 25 grips electronic device 12 produced on base member 55 by second fabricating unit 23 or mounting unit 24 with robot arm 111, and detaches electronic device 12 from base member 55. In addition, assembly unit 25 grips electronic device 12 with robot arm 111 and attaches electronic device 12 to attached object 11.

Scanning unit 26 is a device for creating 3D data. Scanning unit 26 is provided with, for example, a movable camera to capture an image of electronic device 12 and the like from each direction in the X-axis direction, the Y-axis direction, and the Z-axis direction. Production device 10 creates 3D data 112 of electronic device 12 based on the captured image data captured by scanning unit 26, and stores 3D data 112 in storage device 119 of production device 10 (refer to FIG. 3). A method for creating 3D data 112 is not limited to a method of capturing an image with a camera, and other methods such as scanning with infrared rays may be used. In addition, a target for creating 3D data 112 is not limited to electronic device 12, and may be attached object 11. In addition, production device 10 may use the captured image data of scanning unit 26 for a purpose other than the creation of 3D data 112. For example, production device 10 may execute the inspection of fabricated object 13 based on the captured image data of scanning unit 26.

Next, a configuration of control device 27 of production device 10 will be described. As illustrated in FIGS. 2 and 3, control device 27 is provided with controller 117, multiple drive circuits 118, and storage device 119. Multiple drive circuits 118 are connected to electromagnetic motors 38 and 39, holding device 52, lifting and lowering device 53, first fabricating unit 22, second fabricating unit 23, mounting unit 24, assembly unit 25, and scanning unit 26.

Controller 117 is provided with CPU, ROM, RAM, and the like, is mainly a computer, and is connected to multiple drive circuits 118. Storage device 119 is provided with RAM, ROM, a hard disk, and the like, and is used for storing above-described 3D data 112. In addition, storage device 119 stores control program 113 and design data 114. Control program 113 is a program for controlling production device 10. Controller 117 can control the operations of conveyance device 20, first fabricating unit 22, and the like by executing control program 113 by the CPU. In the following descriptions, the fact that controller 117 executes control program 113 to control each device may be simply referred to as "device". For example, "controller 117 moves stage 43" means that "controller 117 executes control program 113 by the CPU, controls the operation of conveyance device 20 via drive circuit 118, and moves stage 43 by the operation of conveyance device 20".

Design data 114 is 3D data of each layer obtained by slicing fabricated object 13 (electronic device 12 or attached object 11) of the completed article. Controller 117 determines a discharge position or the like of the ultraviolet curable resin based on design data 114 of storage device 119, and fabricates fabricated object 13. In addition, controller 117 determines a layer or a position at which electronic component 81 is disposed based on design data 114, and mounts electronic component 81 on circuit board 83.

2. Difference in Fabricating Method of First Fabricating Unit 22 and Second Fabricating Unit 23

As described above, production device 10 of the present embodiment fabricates circuit board 83 in second fabricating unit 23, and fabricates attached object 11 to which electronic device 12 is attached in first fabricating unit 22. In a case where a conductor such as wiring 89, through-hole 91, and connection terminal 93 is fabricated, there is a limitation on the fabricating.

Specifically, FIG. 6 illustrates a difference in the fabricating method between first fabricating unit 22 and second fabricating unit 23 of each embodiment. For example, the ultraviolet curable resin used by third printing section 71 has a lower wettability with respect to the conductor than the ultraviolet curable resin used by first printing section 61. Here, the wettability indicates, for example, the affinity of a liquid on the surface of a solid. When the wettability is increased, the affinity is improved, and the liquid easily wets and spreads on the surface of the solid. On the other hand, when the wettability is reduced, the affinity deteriorates, and the liquid is difficult to wet and spread on the surface of the solid. In a case where the wettability of the ultraviolet curable resin is high, there is a possibility that the ultraviolet curable resin discharged on wiring 89, through-hole 91, connection terminal 93, and the like may be applied and spread beyond the position defined by design data 114. As a result, there is a possibility that the conductivity or the like of wiring 89 may be reduced, resulting in a deterioration in electrical characteristics. Therefore, a resin having a lower wettability is used as the ultraviolet curable resin used by third printing section 71. As a result, it is possible to suppress applying and spreading the ultraviolet curable resin, to fabricate the ultraviolet curable resin with a shape closer to design data 114, and to improve the electrical characteristics of the conductor.

For example, the linear expansion coefficient of the ultraviolet curable resin used by third printing section 71 of second fabricating unit 23 is smaller than the linear expansion coefficient of the ultraviolet curable resin used by first printing section 61 of first fabricating unit 22. In the production of wiring 89 and connection terminal 93, heat is also applied to insulating layer 87 below the metal ink or the like when the metal ink or the conductive resin paste is fired. Insulating layer 87 is heated to expand in accordance with the linear expansion coefficient of the ultraviolet curable resin constituting insulating layer 87. When insulating layer 87 expands, there is a possibility that a part of wiring 89 or the like formed on insulating layer 87 may swell or crack. Therefore, for example, a resin having a smaller linear expansion coefficient is used as the ultraviolet curable resin used by third printing section 71. Alternatively, for example, as the ultraviolet curable resin used by third printing section 71, a resin having a higher glass transition point than the heating temperature for firing by firing section 74 may be used. As a result, it is possible to suppress the expansion of insulating layer 87 for firing, and to suppress the cracking of wiring 89 and the like.

For example, the ultraviolet curable resin used by third printing section 71 has higher adhesion to the conductor than the ultraviolet curable resin used by first printing section 61. Here, the adhesion indicates, for example, the height of the adhesion force of the ultraviolet curable resin to the conductor. The adhesion is, for example, the degree of adhesion force to the conductor immediately after discharge in a case where droplets of the ultraviolet curable resin are discharged on the conductor such as wiring 89. In this case, for example, the adhesion can be evaluated with an adhesion force for a predetermined time from the discharge. Alternatively, the adhesion refers to the degree of adhesion force of insulating layer 87 to the conductor after droplets of the ultraviolet curable resin are discharged on the conductor and cured. In this case, for example, the adhesion can be evaluated by an adhesion force for a predetermined time after curing with ultraviolet light. In addition, the adhesion can be evaluated also by the adhesion force of the metal ink or the conductive resin paste to insulating layer 87. That is, the adhesion of the present disclosure means a height of adhesion force between the ultraviolet curable resin (insulating layer 87) and the metal ink or the conductive resin paste (conductor).

When an ultraviolet curable resin having a low adhesion force is used, there is a possibility that a conductor disposed on insulating layer 87 or a conductor disposed in insulating layer 87 peels off from insulating layer 87. As a result, a gap may be formed in a part of circuit board 83, or a part of circuit board 83 may be peeled off. Therefore, a resin having higher adhesion is used as the ultraviolet curable resin used by third printing section 71. As a result, it is possible to improve the adhesion between the conductor and insulating layer 87 and to suppress the peeling of the conductor or insulating layer 87.

Meanwhile, as the ultraviolet curable resin used by first printing section 61, various resins can be widely employed without limiting the linear expansion coefficient, the glass transition point, the wettability, the adhesion, and the like as described above. There is a possibility that the more a low linear expansion coefficient, a high glass transition point, a low wettability, a high adhesion, and the like are required, the relatively higher the price of the ultraviolet curable resin that can be used. When an ultraviolet curable resin such as a low linear expansion coefficient is used for entire fabricated object 13, the production cost of fabricated object 13 increases. Therefore, production device 10 of the present embodiment uses an ultraviolet curable resin having different physical properties as the ultraviolet curable resin used for first fabricating unit 22 and second fabricating unit 23.

Therefore, the ultraviolet curable resin (an example of the second curable resin of the present disclosure) used in electronic device 12 of the present embodiment satisfies a condition in which the wettability to the conductor such as wiring 89 and connection terminal 93 is lower than that of the ultraviolet curable resin (an example of the first curable resin of the present disclosure) used for fabricating attached object 11, a condition in which a linear expansion coefficient is lower than that of the ultraviolet curable resin used for electronic device 12, and a condition in which adhesion is higher than that of the ultraviolet curable resin used for electronic device 12.

In a case where the ultraviolet curable resin is discharged or the like on the conductor fabricated with the metal ink or the conductive resin paste, there is a possibility that the conductivity of the conductor may be deteriorated by applying and spreading the ultraviolet curable resin. Therefore, in order to suppress applying and spreading up to a position closer to design data 114, the ultraviolet curable resin used for electronic device 12 is required to have low wettability. In addition, when insulating layer 87 expands for heating the metal ink or the like, cracking or cutting may occur in the conductor. In addition, when the adhesion of the ultraviolet curable resin to the conductor is low, the conductor may be peeled off from insulating layer 87. Therefore, the ultraviolet curable resin used for electronic device 12 is required to have a low linear expansion coefficient and high adhesion. As will be described later, by dividing the producing step of circuit board 83 into the producing step of attached object 11, the above-described limitations on the ultraviolet curable resin used for attached object 11 can be alleviated.

The ultraviolet curable resin used for electronic device 12 may be an ultraviolet curable resin satisfying at least one of the above three conditions, or need not satisfy any of the three conditions. For example, the ultraviolet curable resin used for attached object 11 may be a resin satisfying a condition in which color can be easily changed, a condition in which a fabricating speed is high, and the like as compared with the ultraviolet curable resin used for electronic device 12. Therefore, in the ultraviolet curable resin used for attached object 11, since attached object 11 is a normal resin fabricated object, and does not include a conductor or electronic component 81, the degree of freedom in selection is high.

In fabricating a conductor such as wiring 89 as described above, the temperature of the metal ink or the like increases in a firing process by firing section 74. As a result, when the firing of the conductor is executed in a state of being supported by support member 15, there is a possibility that support member 15 may melt. In such a case, in fabricating second fabricating unit 23, a limitation in which support member 15 cannot be used occurs. Therefore, in production device 10 of the present embodiment, support member 15 is not used in the fabricating in second fabricating unit 23, and support member 15 is used in the fabricating in first fabricating unit 22. As a result, it is possible to produce fabricated object 13 in which the conductor is fabricated by the additive manufacturing method while fabricating the overhang portion and the like using support member 15.

3. Operation of Production Device

Figure 7:
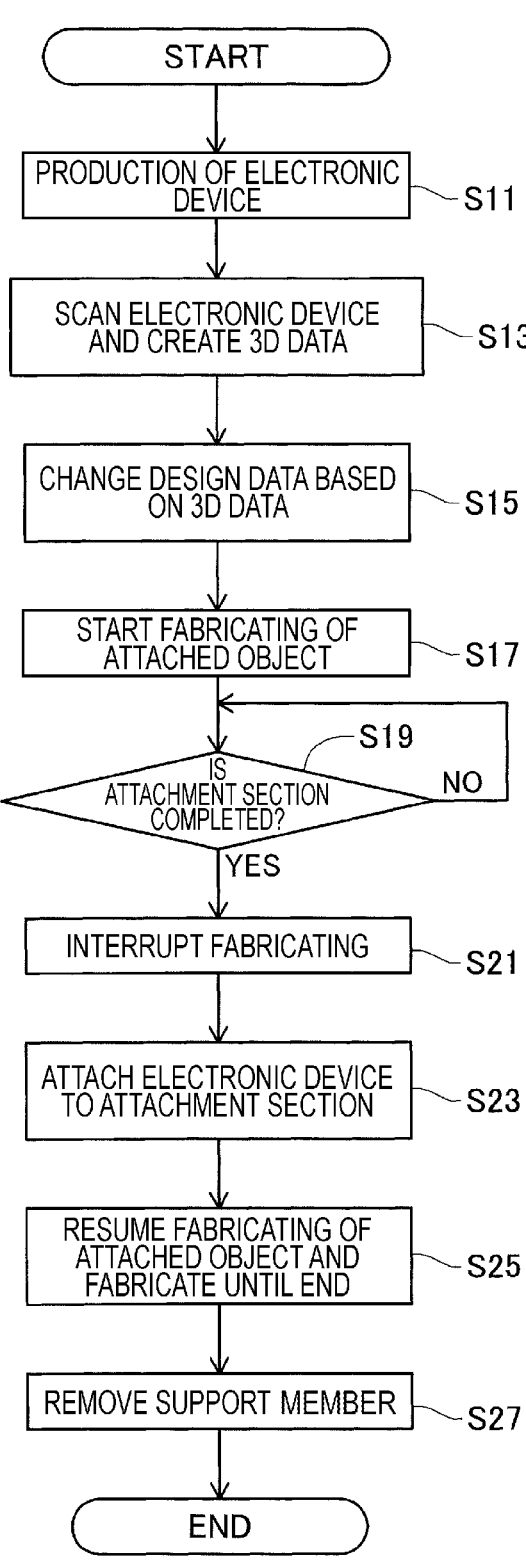
FIG. 7 is a flowchart illustrating a producing step of the fabricated object.

Next, a producing step of fabricated object 13 to which electronic device 12 illustrated in FIG. 4 is attached will be described. FIG. 7 is a flowchart illustrating a producing step of fabricated object 13. The contents, the order, and the like of each step of the producing step illustrated in FIG. 7 are merely examples. In addition, in design data 114 of storage device 119, for example, 3D data of each layer obtained by slicing completed fabricated object 13 is set. Controller 117 executes control program 113 by the CPU, and causes first fabricating unit 22 and the like based on design data 114 to execute the control illustrated in FIG. 7.

First, in step (hereinafter, simply referred to as S) 11 in FIG. 7, controller 117 executes the production of electronic device 12. When base member 55 is set on base table 51 of stage 43, controller 117 produces electronic device 12 on base member 55 while moving stage 43. Controller 117 causes conveyance device 20 to move stage 43 to second fabricating unit 23 or mounting unit 24. Second fabricating unit 23 fabricates insulating layer 87 by discharging the ultraviolet curable resin from third printing section 71 based on the control of controller 117 and curing the ultraviolet curable resin in curing section 72. In addition, in the process of fabricating insulating layer 87, second fabricating unit 23 discharges the metal ink or the conductive resin paste from fourth printing section 73 and fires the metal ink or the conductive resin paste in firing section 74, thereby fabricating the conductor such as wiring 89. As illustrated in FIG. 5, controller 117 fabricates circuit board 83 on release film 85 attached to base member 55. The attaching of release film 85 may be executed manually by a person or may be executed with robot arm 111 of assembly unit 25.

Mounting unit 24 executes the mounting of electronic component 81 in the fabricating of circuit board 83 described above. Controller 117, based on design data 114, for example, discharges the conductive resin paste from fourth printing section 73 in accordance with the position of connection terminal 93, and then mounts electronic component 81 by mounting unit 24. As illustrated in FIG. 5, controller 117 causes mounting section 106 to mount electronic component 81 so that terminal 82 of electronic component 81 is connected to wiring 89 via connection terminal 93. After electronic component 81 is mounted, controller 117 fabricates connection terminal 93 by firing the conductive resin paste by firing section 74, and mounts electronic component 81 on circuit board 83. Controller 117 produces electronic device 12 illustrated in FIG. 5 while appropriately executing each of the above-described steps.

When the production of electronic device 12 ends in S11, controller 117 causes stage 43 to move to scanning unit 26, and executes the scanning of produced electronic device 12 (S13). Controller 117 captures an image of electronic device 12 produced on base member 55 by scanning unit 26. Controller 117 creates 3D data 112 of electronic device 12 based on the captured image data of scanning unit 26, and stores 3D data 112 in storage device 119 (S13).

In additive manufacturing, since expansion or contraction of a medium used for fabricating an ultraviolet curable resin occurs, the size and shape of a fabricated object to be actually fabricated may be different from design data 114. For example, the fabricated object to be actually fabricated expands or contracts by several tens of μm as compared with design data 114. When an error occurs in the size and shape of electronic device 12, there is a failure that electronic device 12 interferes with attachment section 11A, or a gap is formed between electronic device 12 and the inner wall of attachment section 11A, when electronic device 12 is attached to attachment section 11A of attached object 11.

After executing S13, controller 117 corrects the size and shape of attachment section 11A of design data 114 based on 3D data 112 created in S13 (S15). As a result, it is possible to correct design data 114 of attachment section 11A that matches the size and shape of actually produced electronic device 12, that is, corrected the error in the fabricating. Controller 117 corrects, for example, the value, the discharge amount, and the like of the fabricating position of attachment section 11A in design data 114 so as to be attachment section 11A corresponding to the shape of 3D data 112 (S15).

Similarly to the fabricating of electronic device 12, expansion and contraction of the ultraviolet curable resin may occur even in the fabricating of attached object 11. Therefore, controller 117 may correct design data 114 of attached object 11 based on the design error of attached object 11 itself. For example, controller 117 may correct design data 114 of attached object 11 by the amount of expansion or contraction of electronic device 12, that is, the amount equivalent to the error in the fabricating of electronic device 12. For example, in a case where electronic device 12 is expanded by 10 μm from design data 114, it is assumed that attachment section 11A is also expanded by 10 μm, and the hole of attachment section 11A may be increased by 20 μm. That is, it is assumed that attachment section 11A also expands similarly to electronic device 12, and the shape of attachment section 11A may be corrected by a double amount.

Alternatively, similarly to electronic device 12, controller 117 may once fabricate to scan attached object 11, and create 3D data 112 of attached object 11 to correct design data 114. In addition, controller 117 may also scan electronic device 12 to correct design data 114 of electronic device 12 to be produced next. In addition, controller 117 may first fabricate attached object 11 to scan attached object 11, without scanning electronic device 12, and correct design data 114 of electronic device 12.

After executing S15, controller 117 moves stage 43 to first fabricating unit 22, and starts the fabricating of attached object 11 (S17). For example, controller 117 moves stage 43 in which electronic device 12 is fabricated to firing section 74, applies heat to release film 85 by firing section 74, and causes release film 85 to be peeled off. Controller 117 moves stage 43 to assembly unit 25, detaches electronic device 12 or release film 85 from base member 55, and disposes detached electronic device 12 on a working table (not illustrated) of assembly unit 25 or the like. Controller 117 fabricates attached object 11 on base member 55 from which release film and electronic device 12 are removed. Controller 117 may release the fixing of holding device 52, detach base member 55 on which electronic device 12 is placed from stage 43, and attach new base member 55 to stage 43 to fabricate attached object 11.

Figure 8:
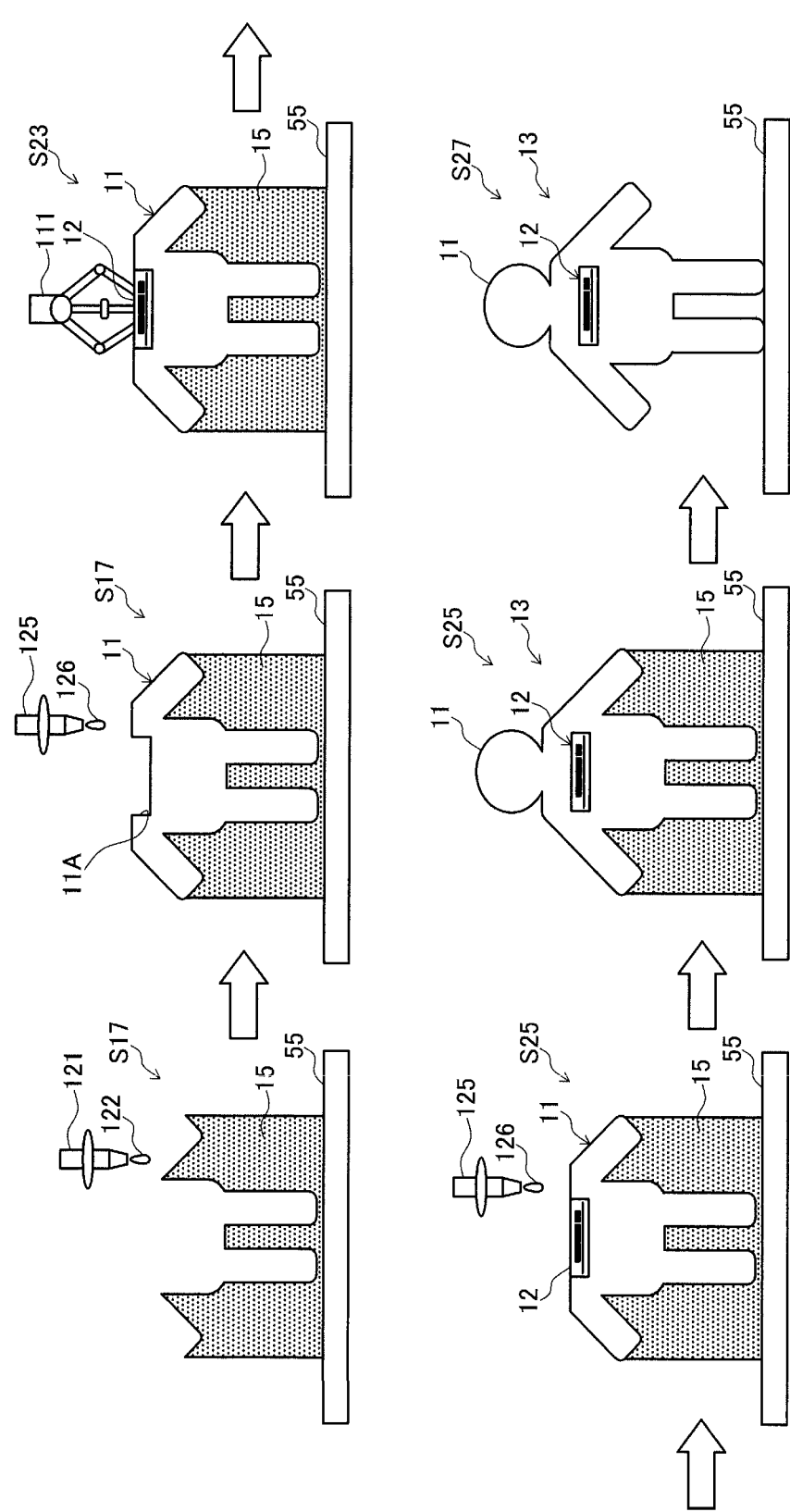
FIG. 8 is a diagram illustrating a producing step of the fabricated object.

FIG. 8 illustrates a fabricating step of fabricated object 13. As illustrated in FIG. 8, controller 117, for example, causes second printing section 63 to discharge support material 122 from ink jet head 121 of second printing section 63 onto base member 55, and to cure support material 122 to fabricate support member 15. A mold for fabricating attached object 11 is fabricated on support member 15. Next, controller 117 discharges ultraviolet curable resin 126 from ink jet 125 of first printing section 61 onto support member 15. Ultraviolet curable resin 126 is, for example, a resin having a higher linear expansion coefficient, a resin having a higher wettability, a resin having a lower adhesion, or the like than the ultraviolet curable resin in which insulating layer 87 of above-described fabricated object 13 is fabricated. Controller 117 repeatedly executes the discharge of ultraviolet curable resin 126 by first printing section 61 and the curing of ultraviolet curable resin 126 by curing section 62 to fabricate attached object 11.

Meanwhile, as illustrated in FIG. 7, controller 117 executes S17 and determines whether the fabricating of attachment section 11A has been completed after starting the fabricating of attached object 11 (S19). Controller 117 continues the fabricating of attached object 11 until the fabricating of attachment section 11A is completed (S19: NO). When the fabricating of attachment section 11A is completed (S19: YES), controller 117 interrupts the fabricating of attached object 11 (S21).

Therefore, controller 117 scans electronic device 12 produced in S11, and creates 3D data 112 of electronic device 12 (S13). Controller 117 corrects the shape of attachment section 11A in design data 114 of attached object 11 based on created 3D data 112, and fabricates attached object 11 based on corrected design data 114 (S17).

In the case of fabricating by the additive manufacturing method, an error in shape and size occurs between design data 114 and fabricated object 13 to be actually fabricated. Therefore, the shape of attachment section 11A of design data 114 is corrected based on 3D data 112 obtained by scanning actually fabricated electronic device 12. As a result, the shape of attachment section 11A can be adjusted to the shape of actually fabricated electronic device 12, and electronic device 12 can be attached to attachment section 11A without causing interference or the like.

Controller 117 moves stage 43 to assembly unit 25, and executes an operation of attaching electronic device 12 to attachment section 11A (S23). As illustrated in FIG. 8, controller 117 causes robot arm 111 of assembly unit 25 to attach electronic device 12 produced in S11 to attachment section 11A. For example, robot arm 111 picks up electronic device 12 by the suction nozzle and disposes electronic device 12 in attachment section 11A, and then pushes electronic device 12 into attachment section 11A by the arm to execute the attaching of electronic device 12.

When the attaching of electronic device 12 is completed in S23, controller 117 moves stage 43 to first fabricating unit 22 again, and resumes the fabricating of attached object 11 (S25). As illustrated in FIG. 8, for example, controller 117 discharges ultraviolet curable resin 126 from ink jet 125 of first printing section 61 onto electronic device 12 attached to attachment section 11A to cure ultraviolet curable resin 126. Controller 117 executes fabricating by first fabricating unit 22 until the fabricating of attached object 11 is completed (S25).

When all of the fabricating of attached object 11 is completed, controller 117 moves stage 43 to removal section 64, and executes the removal of support member 15 (S27). For example, removal section 64 removes support member 15 by placing completed fabricated object 13 and support member 15 on base member 55 in a water tank of water or a chemical. As a result, it is possible to produce fabricated object 13 to which electronic device 12 is attached.

The production method described above is an example. For example, production device 10 may be provided with two conveyance devices 20 to produce electronic device 12 and attached object 11 in parallel. In addition, production device 10 may scan electronic device 12 every time fabricated object 13 is produced, and may use design data 114 to fabricate attached object 11 (attachment section 11A) to be fabricated later, after correcting design data 114 once based on 3D data 112.

4. Second Embodiment

In addition, in the above first embodiment, both first fabricating unit 22 and second fabricating unit 23 use an ink jet method as the additive manufacturing method; however, the configuration is not limited to this. For example, as the additive manufacturing method, a stereo lithography method (SLA), a fused deposition molding method (FDM), a powder sintering additive manufacturing method (SLS), or the like can be employed. In the following descriptions, as the second embodiment, a case where first fabricating unit 22 uses a pull-down type stereo lithography method will be described (refer to FIG. 6).

Figure 9:
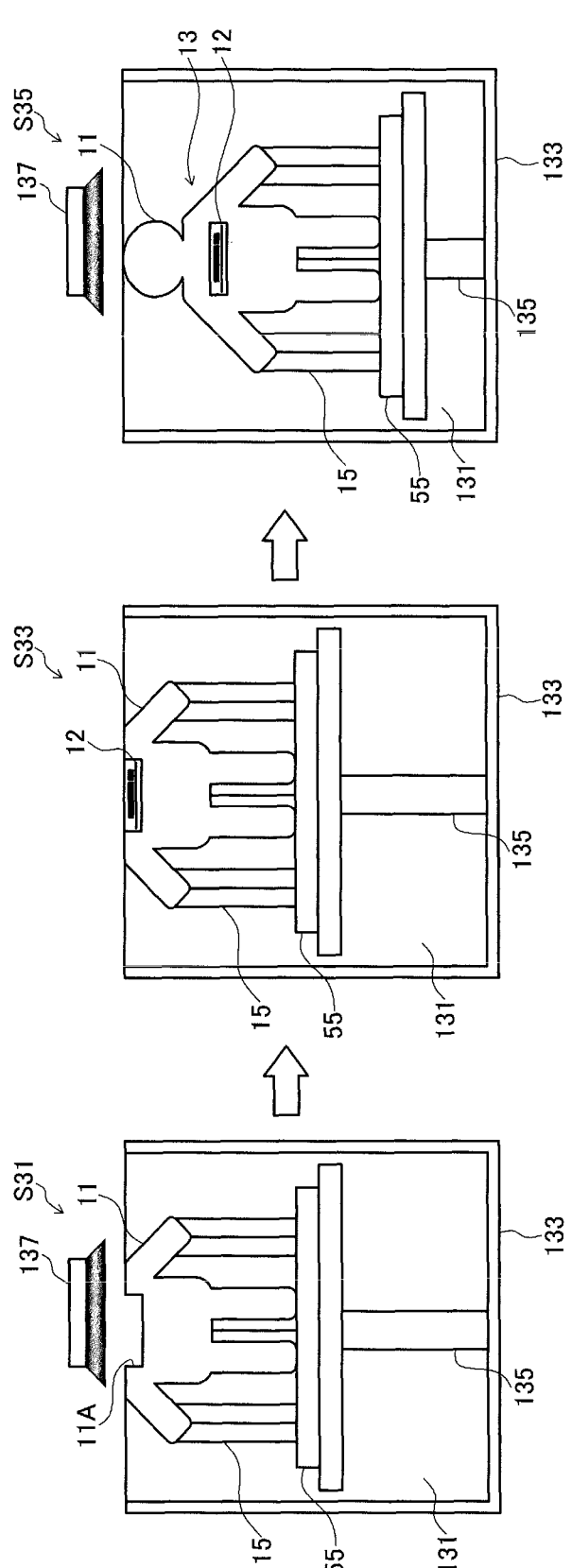
FIG. 9 is a diagram illustrating a producing step according to a second embodiment.

FIG. 9 illustrates a producing step of fabricated object 13 according to the second embodiment. The structure of fabricated object 13 of the second embodiment is the same as that of fabricated object 13 of the first embodiment. As illustrated in FIG. 9, in the second embodiment, for example, the fabricating of attached object 11 is executed while base member 55 is lowered in bathtub 133 storing liquid ultraviolet curable resin 131. For example, lifting and lowering device 135 for lifting and lowering base member 55 is provided in bathtub 133. Controller 117 irradiates ultraviolet curable resin 131 in bathtub 133 with the ultraviolet light from exposure device 137 to cure ultraviolet curable resin 131. Exposure device 137 is provided with, for example, a light source, a polygon mirror, a reflecting mirror, or the like, and can irradiate any position of ultraviolet curable resin 131 stored in bathtub 133 with the ultraviolet light.

Controller 117 fabricates support member 15 on base member 55 by second printing section 63, and then disposes base member 55 in which support member 15 is fabricated in lifting and lowering device 135. The operation of disposing base member 55 in lifting and lowering device 135 may be executed manually by a person, or may be executed by controller 117 with a robot arm or the like. When base member 55 is set in lifting and lowering device 135, controller 117 causes lifting and lowering device 135 to lower base member 55 each time one layer of ultraviolet curable resin 131 is cured by controlling exposure device 137, and laminates cured ultraviolet curable resin 131 to fabricate attached object 11 (S31). Controller 117 continues the curing operation by exposure device 137 and the lowering operation by lifting and lowering device 135 until the fabricating of attachment section 11A is completed. Similarly to the first embodiment described above, controller 117 may correct design data 114 of attachment section 11A based on 3D data 112 obtained by scanning electronic device 12 fabricated in advance.

When the fabricating of attachment section 11A is completed, controller 117 interrupts the fabricating operation of attached object 11 and attaches electronic device 12 to attachment section 11A (S33). The operation of attaching electronic device 12 may be performed manually by a person, or may be executed with robot arm 111 or the like, similarly to the first embodiment. When the attaching operation of electronic device 12 is completed, controller 117 resumes the curing operation by exposure device 137 and executes the fabricating of attached object 11 until the end (S35). Even in a case where such a stereo lithography method is used, by dividing a fabricating step of attached object 11 and a fabricating step of electronic device 12, it is possible to alleviate the limitation of the physical properties required for ultraviolet curable resin 131 stored in bathtub 133.

Therefore, in each of the above-described embodiments, in the fabricating of attached object 11, the fabricating is temporarily interrupted at the stage when attachment section 11A is fabricated, electronic device 12 is attached to attachment section 11A, and then the fabricating of the remaining portion of attached object 11 is resumed. As a result, a portion of fabricated object 13 excluding electronic device 12 (attached object 11) can be fabricated in one fabricating step. It is possible to relatively easily create design data 114 of attached object 11 and fabricate attached object 11.

At a stage where all of the fabricating of attached object 11 is ended, electronic device 12 is covered with ultraviolet curable resins 126 and 131, and electronic device 12 is incorporated in and fixed to attached object 11. As a result, it is possible to produce fabricated object 13 for fixing electronic device 12 to attached object 11 while alleviating the limitation on the ultraviolet curable resin for fabricating attached object 11.

In the fabricating of attached object 11, attached object 11 is fabricated using support member 15 while supporting the fabricated object obtained by curing ultraviolet curable resins 126 and 131 with support member 15. Among the support members 15, there is a support member that is melted at the heating temperature for firing a metal ink or the like. Therefore, when electronic device 12 is directly fabricated on attachment section 11A of attached object 11, support member 15 may be melted for firing. As a result, there is a possibility that the shape of attached object 11 that can be fabricated may be limited. To the contrary, by dividing attached object 11 into a fabricating step and a fabricating step of electronic device 12, attached object 11 can be fabricated while using support member 15, so that the degree of freedom in the shape of attached object 11 can be improved.

In each of the above examples, electronic device production device 10 is an example of the production device. Fabricated object 13 is an example of the three-dimensionally fabricated object. First fabricating unit 22 is an example of the first fabricating device. Second fabricating unit 23 is an example of the second fabricating device. Assembly unit 25 is an example of the attachment device. Insulating layer 87 is an example of the resin layer. Wiring 89, through-hole 91, and connection terminal 93 are examples of the conductor. Ultraviolet curable resins 126 and 131 are examples of the first curable resin. S11 is an example of the second fabricating step. S17 and S25 are examples of the first fabricating step. S23 is an example of the attaching step. The metal ink and the conductive resin paste are examples of the fluid containing the metal particle. S13 is an example of the 3D data creating step.

As described above, according to each of the above embodiments, the following advantages can be obtained. Controller 117 of the embodiment fabricates insulating layer 87 with an ultraviolet curable resin having a physical property different from that of ultraviolet curable resins 126 and 131, fabricates wiring 89 or the like with a metal ink or a conductive resin paste, and fabricates electronic device 12 (S11). In addition, controller 117 fabricates attached object 11 having attachment section 11A with ultraviolet curable resins 126 and 131 (S17, S25, S31, and S35). Controller 117 attaches electronic device 12 to attachment section 11A of attached object 11 (S23).

As a result, electronic device 12 is fabricated in S11 and attached to attached object 11 fabricated in another step (S17 and S25). In other words, attached object 11 to which electronic device 12 is attached can be fabricated in a separate step from electronic device 12. Therefore, ultraviolet curable resins 126 and 131 used in S17 or the like are not limited in the physical properties required for the ultraviolet curable resin used in S11. The limitation on the physical properties required for ultraviolet curable resins 126 and 131 can be alleviated, and the degree of freedom in selecting ultraviolet curable resins 126 and 131 is improved. In addition, since the degree of freedom in selecting ultraviolet curable resins 126 and 131 is improved, it is possible to suppress the production cost of producing fabricated object 13.

5. Others

The present disclosure is not limited to each of the above examples, but may be practiced in various modes in which various changes and modifications are made based on the knowledge of those skilled in the art. For example, the configuration of above-described production device 10 is an example. The fabricating device for fabricating attached object 11 and the production device for producing electronic device 12 may be separate devices. In addition, production device 10 may include a conveyance device for producing electronic device 12 separately from stage 43 (conveyance device 20) for fabricating attached object 11. Production device 10 may execute operations for fabricating attached object 11 and electronic device 12 on separate stages 43 in parallel. In addition, the attaching of electronic device 12 to attached object 11 may be performed manually by a person. The structure and the like of fabricated object 13 illustrated in FIG. 4 are examples. For example, attached object 11 may have a shape other than a human shape. Fabricated object 13 may include multiple two or more electronic devices 12. Electronic device 12 may be configured to not include electronic component 81. In addition, production device 10 may include one of curing section 62 and curing section 72. That is, production device 10 may include only one device that can be shared. For example, in a case where support member 15 is melted by heat, support member 15 may be melted by firing section 74 of production device 10. In this case, production device 10 needs not include removal section 64. The ultraviolet curable resin of first printing section 61 and the ultraviolet curable resin of third printing section 71 may be an ultraviolet curable resin having the same physical properties.

In addition, in the above examples, the ultraviolet curable resin cured by irradiation of ultraviolet light is employed, but various curable resins such as a thermosetting resin cured by heat can be employed. In addition, the three-dimensional additive manufacturing method in the present disclosure is not limited to an ink jet method or a stereo lithography method (SL), and other methods such as a fused deposition molding (FDM) method can be employed.

REFERENCE SIGNS LIST

10: electronic device production device (production device), 11: attached object, 11A: attachment section, 12: electronic device, 13: fabricated object (three-dimensionally fabricated object), 15: support member, 22: first fabricating unit (first fabricating device), 23: second fabricating unit (second fabricating device), 25: assembly unit (attachment device), 87: insulating layer (resin layer), 89: wiring (conductor), 91: through-hole (conductor), 93: connection terminal (conductor), 112: 3D data, 114: design data, 126, 131: ultraviolet curable resin (first curable resin)

The invention claimed is:

1. A production device for producing a three-dimensionally fabricated object in which an electronic device is attached to an attached object, the device comprising:
   a first fabricating device configured to fabricate the attached object having an attachment section, to which the electronic device is attachable, with a first curable resin, using an additive manufacturing method;
   a second fabricating device configured to fabricate a resin layer with a second curable resin, fabricate a conductor with a fluid containing a metal particle, and fabricate the electronic device having the conductor in the resin layer, using the additive manufacturing method;
   an attachment device configured to attach the electronic device to the attachment section of the attached object;
   a scanning device configured to scan the attachment section and scan the electronic device; and
   a controller configured to control each of the first fabricating device, the second fabricating device, the attachment device, and the scanning device, the controller configured to:
      control the second fabricating device to fabricate the electronic device,
      control the scanning device to scan the electronic device,
      create 3D data from the scan of the electronic device by the scanning device prior the first fabricating device fabricating the attachment section,
      create a corrected shape of the attachment section in design data of the attached object based on the 3D data, and
      control the first fabricating device to fabricate the attachment object up to the attachment section based on the corrected shape;
      control the attachment device to attach the electronic device to the attachment section; and
      control the first fabricating device to fabricate a remaining portion of the attachment object after attaching the electronic device.

2. The production device for producing the three-dimensionally fabricated object according to claim 1, further comprising:
   a storage device that stores the design data which is data of each layer of the three-dimensionally fabricated object and stores the 3D data from the scan of the electronic device, wherein the controller is further configured to correct the design data of the electronic device for a next fabrication of the electronic device by the second fabricating device.

3. The production device for producing the three-dimensionally fabricated object according to claim 1, wherein the controller is further configured to control the scanning device to scan the attachment section, and correct the design data of the attachment section for a next fabrication of the electronic device by the second fabricating device or a next fabrication of the attachment section by the first fabricating device.

4. A production method of using the production device according to claim 1 for producing the three-dimensionally fabricated object in which the electronic device is attached to the attached object, the method comprising:

a first fabricating step of fabricating, with the first fabricating device, the attached object including the attachment section, to which the electronic device is attachable, with the first curable resin, using the additive manufacturing method;

a second fabricating step of fabricating, with the first fabricating device, the resin layer with the second curable resin, fabricating the conductor with the fluid containing the metal particle, and fabricating the electronic device having the conductor in the resin layer, using the additive manufacturing method; and an attaching step of attaching the electronic device to the attachment section of the attached object with the attachment device.

5. The production method for the three-dimensionally fabricated object according to claim 4, wherein in the first fabricating step, fabricating is temporarily interrupted at a stage where the attachment section is fabricated, the electronic device is attached to the attachment section by executing the attaching step, and then fabricating of the remaining portion of the attached object is resumed.

6. The production method for the three-dimensionally fabricated object according to claim 5, wherein in the first fabricating step, at a stage where the first fabricating step is ended, the electronic device is covered with the first curable resin, and the electronic device is fixed to the attached object.

7. The production method for the three-dimensionally fabricated object according to claim 4, wherein the second curable resin in the second fabricating step satisfies at least one of a condition in which wettability to the conductor is lower than that of the first curable resin in the first fabricating step, a condition in which a linear expansion coefficient is lower than that of the first curable resin, or a condition in which adhesion to the conductor is higher than that of the first curable resin.

8. The production method for a three-dimensionally fabricated object according to claim 4, wherein in the first fabricating step, using a support member, the attached object is fabricated while supporting the fabricated object obtained by curing the first curable resin with the support member.

9. The production method for the three-dimensionally fabricated object according to claim 4, the method further comprising:

a 3D data creating step of scanning the electronic device fabricated in the second fabricating step with the scanning device, and creating the 3D data of the electronic device, wherein in the first fabricating step, the shape of the attachment section in the design data of the attached object is corrected based on the 3D data created in the 3D data creating step, and the attached object is fabricated based on the design data.

* * * * *